(12) United States Patent
Nakamura et al.

(10) Patent No.: US 11,368,040 B2
(45) Date of Patent: Jun. 21, 2022

(54) POWER SUPPLY SYSTEM, DCDC CONVERTER DEVICE, AND CHARGING METHOD

(71) Applicant: YAZAKI CORPORATION, Tokyo (JP)

(72) Inventors: Masashi Nakamura, Utsunomiya (JP); Kazuki Kato, Utsunomiya (JP); Akiyoshi Kanazawa, Utsunomiya (JP); Satoshi Enomoto, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 122 days.

(21) Appl. No.: 16/932,670

(22) Filed: Jul. 17, 2020

(65) Prior Publication Data
US 2021/0021147 A1 Jan. 21, 2021

(30) Foreign Application Priority Data
Jul. 18, 2019 (JP) .............................. JP2019-132456

(51) Int. Cl.
*H02J 7/34* (2006.01)
*H02J 7/00* (2006.01)

(52) U.S. Cl.
CPC .......... *H02J 7/342* (2020.01); *H02J 7/00047* (2020.01); *H02J 7/0048* (2020.01); *H02J 7/007182* (2020.01); *H02J 2207/20* (2020.01)

(58) Field of Classification Search
CPC ...... H02J 7/342; H02J 7/00047; H02J 7/0048; H02J 7/007182; H02J 7/00302; B60L 53/20; B60L 53/22; B60L 58/12; B60L 58/22
See application file for complete search history.

(56) References Cited

U.S. PATENT DOCUMENTS

| | | | |
|---|---|---|---|
| 7,419,020 B2 * | 9/2008 | Pott ......................... | H02J 1/08 180/65.1 |
| 2002/0140397 A1 * | 10/2002 | Hasegawa ............. | H02J 7/1423 320/104 |
| 2005/0029890 A1 * | 2/2005 | Kadoya .................. | H02K 21/16 310/180 |

(Continued)

FOREIGN PATENT DOCUMENTS

| | | |
|---|---|---|
| EP | 3 028 337 A2 | 6/2016 |
| JP | 2015-53825 A | 3/2015 |

(Continued)

*Primary Examiner* — David V Henze-Gongola
*Assistant Examiner* — Tarikh Kanem Rankine
(74) *Attorney, Agent, or Firm* — Kenealy Vaidya LLP

(57) ABSTRACT

A power supply system includes a high voltage battery, a first DCDC converter connected to the high voltage battery, a low voltage lead battery configured to be charged from the high voltage battery via the first DCDC converter, a low voltage lithium battery connected to a low voltage power supply circuit, the low voltage lead battery, and a load, a second DCDC converter connected to the low voltage power supply circuit and disposed between the low voltage lead battery and the low voltage lithium battery, a bypass circuit connected to the low voltage power supply circuit to bypass the second DCDC converter, and a control device configured to watch the low voltage lithium battery and control on/off of a switch unit provided in the bypass circuit.

8 Claims, 6 Drawing Sheets

(56) References Cited

U.S. PATENT DOCUMENTS

| | | | |
|---|---|---|---|
| 2011/0057724 A1* | 3/2011 | Pabon | H02M 7/219 327/581 |
| 2012/0112693 A1* | 5/2012 | Kusch | B60L 50/40 320/109 |
| 2012/0261982 A1* | 10/2012 | Wanke | B60L 58/20 307/9.1 |
| 2012/0293124 A1* | 11/2012 | Hirai | H02J 7/1423 320/112 |
| 2012/0326516 A1* | 12/2012 | Gurunathan | H02J 1/00 307/72 |
| 2012/0330538 A1* | 12/2012 | Spjuth | F02N 11/0866 701/113 |
| 2013/0106180 A1* | 5/2013 | Akimasa | F02N 11/087 307/9.1 |
| 2013/0154356 A1* | 6/2013 | Nakajima | B60R 16/033 307/9.1 |
| 2014/0077771 A1* | 3/2014 | Yamashita | B60K 6/28 320/167 |
| 2015/0202983 A1 | 7/2015 | Le et al. | |
| 2015/0202984 A1 | 7/2015 | Wyatt et al. | |
| 2015/0202985 A1* | 7/2015 | Le | B60L 58/12 307/9.1 |
| 2015/0291039 A1* | 10/2015 | Sakata | H01M 10/482 307/10.1 |
| 2017/0162851 A1 | 6/2017 | Wyatt et al. | |
| 2017/0225635 A1* | 8/2017 | Obayashi | F02N 11/108 |
| 2018/0138486 A1 | 5/2018 | Wyatt et al. | |
| 2018/0219397 A1* | 8/2018 | Matsushita | B60L 58/21 |
| 2018/0366712 A1 | 12/2018 | Wyatt et al. | |
| 2019/0074555 A1* | 3/2019 | Zhang | H02J 7/35 |
| 2019/0210473 A1* | 7/2019 | Linehan | H02J 7/0068 |
| 2020/0035978 A1 | 1/2020 | Wyatt et al. | |
| 2020/0079354 A1* | 3/2020 | Damsaz | B60L 3/0092 |
| 2021/0021147 A1* | 1/2021 | Nakamura | B60L 58/20 |
| 2021/0094441 A1* | 4/2021 | Sampson | B60K 1/02 |

FOREIGN PATENT DOCUMENTS

| | | | |
|---|---|---|---|
| JP | 2016-153260 A | 8/2016 | |
| JP | 2018-57179 A | 4/2018 | |
| RU | 2412514 C2 * | 2/2011 | B60K 6/365 |
| TW | M548097 U * | 9/2017 | Y02B 70/10 |
| WO | 2015/016966 A2 | 2/2015 | |

* cited by examiner

POWER SUPPLY SYSTEM, DCDC CONVERTER DEVICE, AND CHARGING METHOD

CROSS REFERENCE TO RELATED APPLICATIONS

This application claims priority from Japanese Patent Application No. 2019-132456 filed on Jul. 18, 2019, the entire contents of which are incorporated herein by reference.

BACKGROUND OF THE INVENTION

Field of the Invention

The present invention relates to a power supply system including high voltage and low voltage DCDC converters, a low voltage lead battery, and a low voltage lithium battery. The present invention relates to a DCDC converter device according to a low voltage DCDC converter. Further, the present invention relates to a charging method using a DCDC converter device.

Description of Related Art

In order to charge a low voltage battery from a high voltage battery, a DCDC converter (step-down type) is provided therebetween. Further, a DCDC converter (step-up type) is provided between the low voltage battery and a load connected to the low voltage battery (for example, see Patent Literature 1: JP-A-2015-53825).

[Patent Literature 1] JP-A-2015-53825

Various apparatuses mounted on automobiles have been miniaturized in the related art. In addition, a system has also been miniaturized.

SUMMARY

One or more embodiments provide a power supply system that can be miniaturized, a DCDC converter device, and a charging method.

In an aspect (1), a power supply system includes a high voltage battery, a first DCDC converter connected to the high voltage battery, a low voltage lead battery configured to be charged from the high voltage battery via the first DCDC converter, a low voltage lithium battery connected to a low voltage power supply circuit, the low voltage lead battery, and a load, a second DCDC converter connected to the low voltage power supply circuit and disposed between the low voltage lead battery and the low voltage lithium battery, a bypass circuit connected to the low voltage power supply circuit to bypass the second DCDC converter, and a control device configured to watch the low voltage lithium battery and control on/off of a switch unit provided in the bypass circuit.

According to the aspect (1), since the bypass circuit for bypassing the second DCDC converter is provided, the second DCDC converter can be used only when it is necessary to charge the low voltage lithium battery. Specifically, when at least constant current charging is performed, the second DCDC converter may be used; when the constant voltage charging is performed without any particular conditions, the second DCDC converter may be bypassed and charged. As a result, the number of FETs in the second DCDC converter can be reduced, and capacity of the second DCDC converter can be reduced. Therefore, the power supply system can be miniaturized.

In an aspect (2), a dark current may flow in the bypass circuit.

According to the aspect (2), since a bypass circuit can also be used as the circuit in which a dark current flows, the number of circuits does not increase, which can consequently contribute to miniaturization of the power supply system.

In an aspect (3), the control device may include a switch control unit configured to control on/off of the switch unit based on a state of charge of the low voltage lithium battery.

According to the aspect (3), since the switch unit of the bypass circuit is turned on/off based on the state of charge (SOC) of the low voltage lithium battery, if the switch unit is turned off when the state of charge is low, a current flows to the second DCDC converter side in the circuit, and constant current charging can be performed by using the second DCDC converter. Then, if the switch unit is turned on when the state of charge escapes from the state in which the state of charge is low, a current flows to the bypass circuit side in the circuit, and constant voltage charging can be performed at a charging voltage to the low voltage lead battery by the first DCDC converter.

In an aspect (4), the switch control unit may be configured to control on/off of the switch unit based on a charging voltage of the low voltage lead battery by the first DCDC converter.

According to the aspect (4), since the switch unit of the bypass circuit is turned on/off based on not only the state of charge (SOC) of the low voltage lithium battery but also the charging voltage to the low voltage lead battery by the first DCDC converter, if the switch unit is turned off when the charging voltage to the low voltage lead battery needs to be higher than the charging voltage to the low voltage lead battery, a current can flow to the second DCDC converter side. Then, in a state where the voltage is stepped up by the second DCDC converter, constant voltage charging can be performed on the low voltage lithium battery.

In an aspect (5), the control device may include a switch control unit configured to control on/off of the switch unit based on a voltage and a predetermined voltage range of the low voltage lithium battery.

According to the aspect (5), since the switch unit of the bypass circuit is turned on/off based on the a voltage and a predetermined voltage range of the low voltage lithium battery, if the switch unit is turned on when the voltage of the low voltage lithium battery is within the predetermined voltage range, a current can flow to the bypass circuit side. Then, constant voltage charging can be performed on the low voltage lithium battery by the charging voltage from the first DCDC converter to the low voltage lead battery.

In an aspect (6), a DCDC converter device includes a second DCDC converter disposed between a low voltage lead battery charged from a high voltage battery via a first DCDC converter and a low voltage lithium battery connected to a low voltage power supply circuit, the low voltage lead battery, and a load, and a bypass circuit connected to the low voltage power supply circuit and bypassing the second DCDC converter. The bypass circuit is provided with a switch unit which is controlled to turn on/off by a control device which is an external configuration.

According to the aspect (6), since the DCDC converter device includes the second DCDC converter and a bypass circuit that bypasses the second DCDC converter, a part of the power supply system according to the aspects (1) to (5)

can be provided as one device. Therefore, the second DCDC converter can be miniaturized, thereby miniaturizing the power supply system.

In an aspect (7), a dark current may flow in the bypass circuit.

According to the aspect (7), since the circuit in which a dark current flows can also be used as a bypass circuit, the number of circuits does not increase, which can consequently contribute to miniaturization of the second DCDC converter.

In an aspect (8), a charging method may include using the DCDC converter device according to the aspect (6) or (7), and turning on the switch unit of the DCDC converter device and performing constant voltage charging on a low voltage lithium battery.

According to the aspect (8), when constant voltage charging is performed without any particular conditions, the second DCDC converter may be bypassed and charged. As a result, the number of FETs in the second DCDC converter can be reduced, and capacity of the second DCDC converter can be reduced.

One or more embodiments provide a power supply system, a DCDC converter device, and a charging method using a DCDC converter device, which can be miniaturized.

DETAILED DESCRIPTION

A power supply system includes: a high voltage battery; a first DCDC converter connected to the high voltage battery; a low voltage lead battery charged from the high voltage battery via the first DCDC converter; a low voltage lithium battery connected to a low voltage power supply circuit together with the low voltage lead battery and a load; a second DCDC converter connected to the low voltage power supply circuit and arranged between the low voltage lead battery and the low voltage lithium battery; a bypass circuit which is connected to the low voltage power supply circuit and bypasses the second DCDC converter; and a control device which controls on/off of a switch unit provided in the bypass circuit while watching the low voltage lithium battery.

Figure 1:
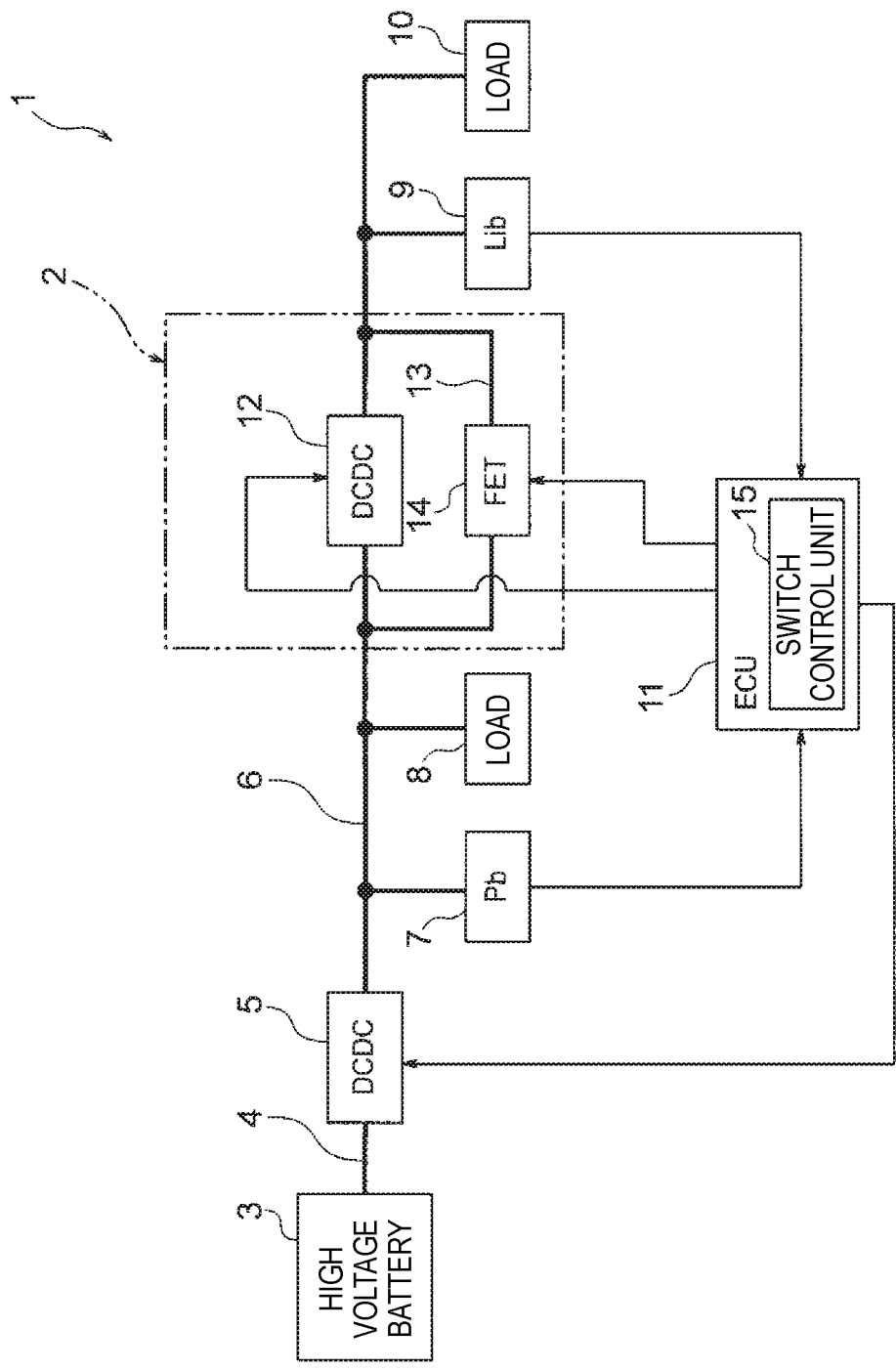
FIG. 1 is a block diagram illustrating an embodiment of a power supply system and a DCDC converter device.
Figure 2:
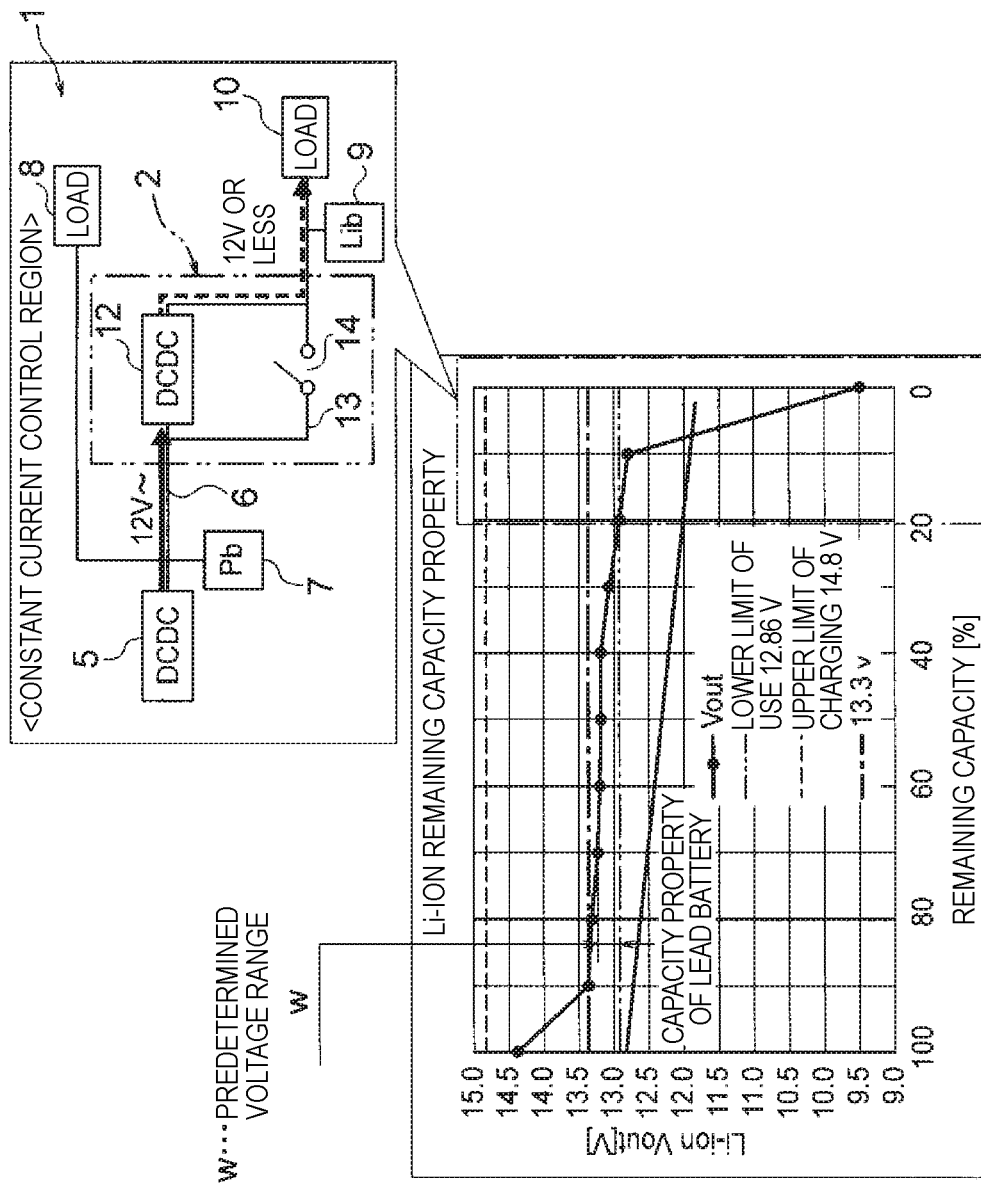
FIG. 2 is an explanatory diagram (graph and block diagram) of a region controlled to be constant current charging.
Figure 3:
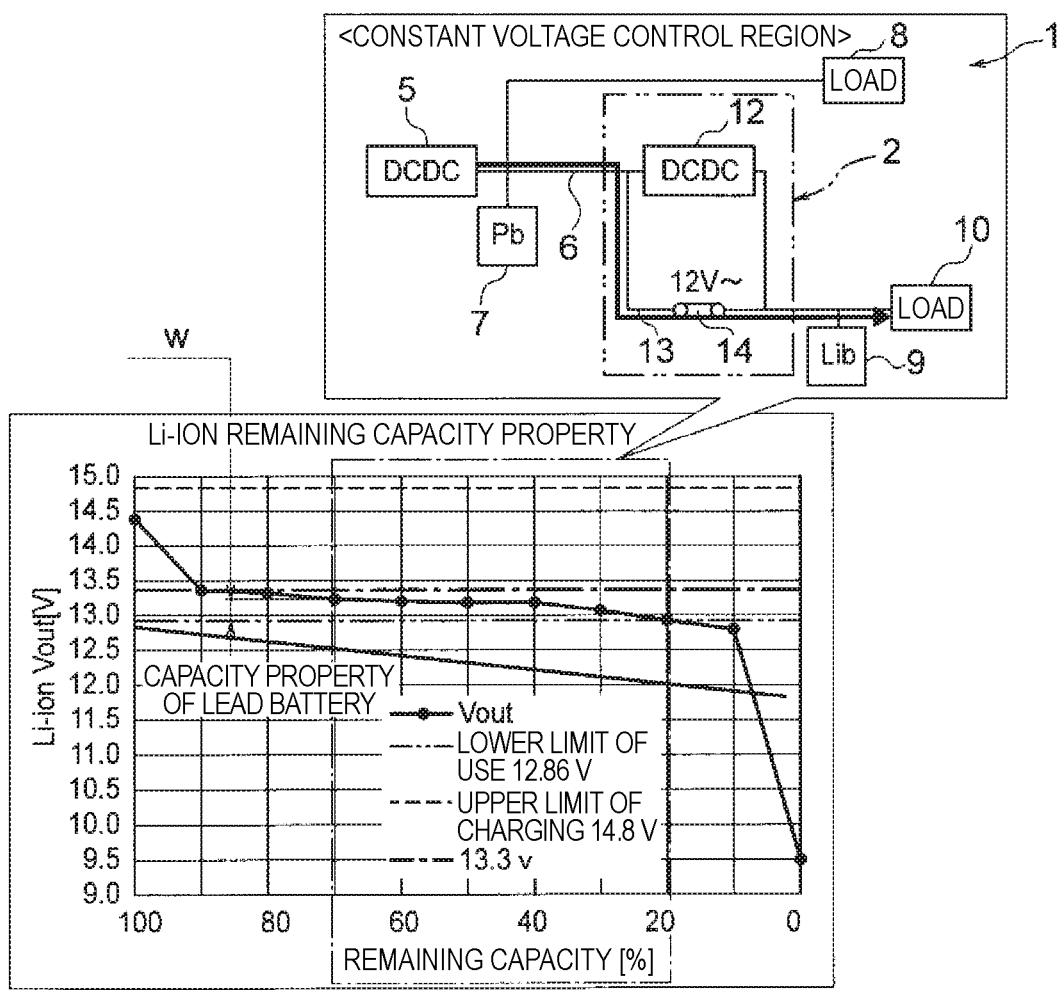
FIG. 3 is an explanatory diagram (graph and block diagram) of a region controlled to be constant voltage charging.
Figure 4:
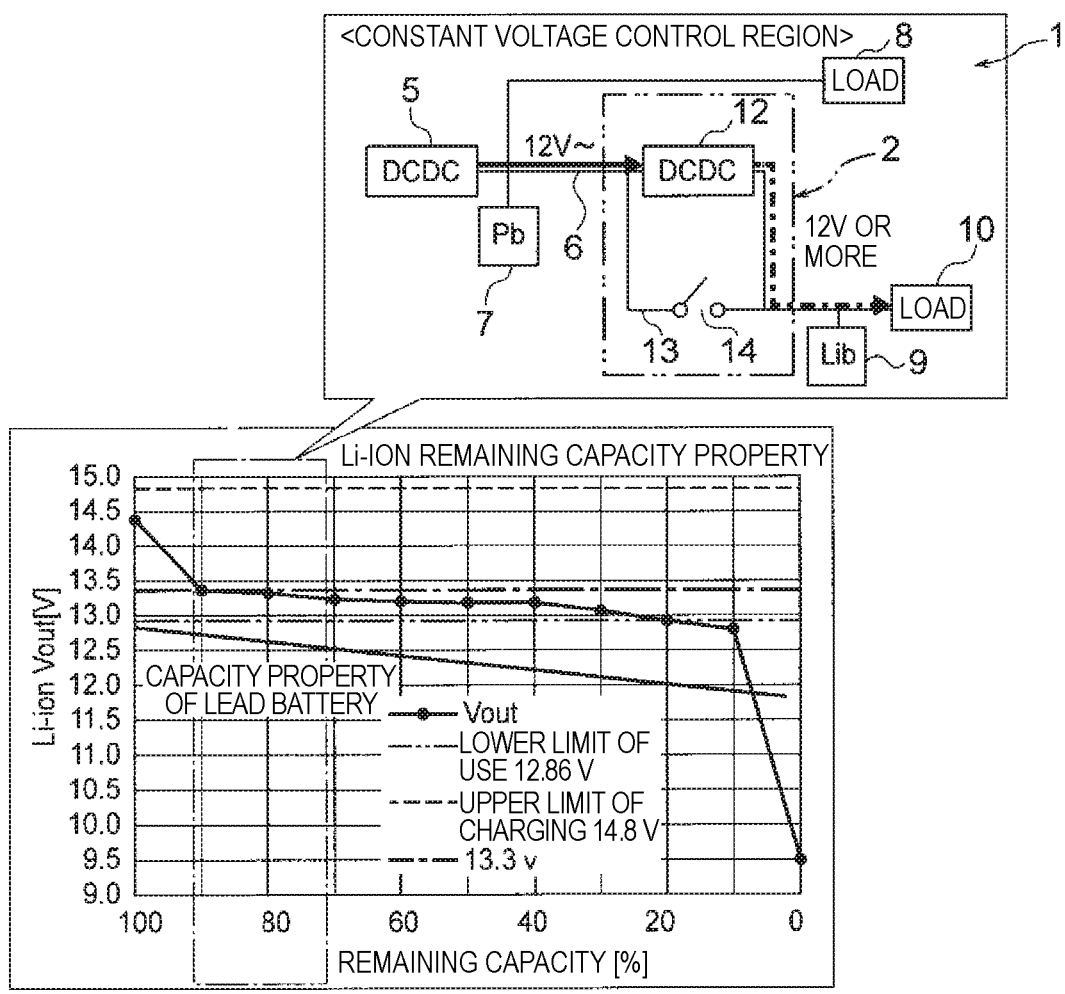
FIG. 4 is an explanatory diagram (graph and block diagram) of a region controlled to be constant voltage charging.
Figure 5:
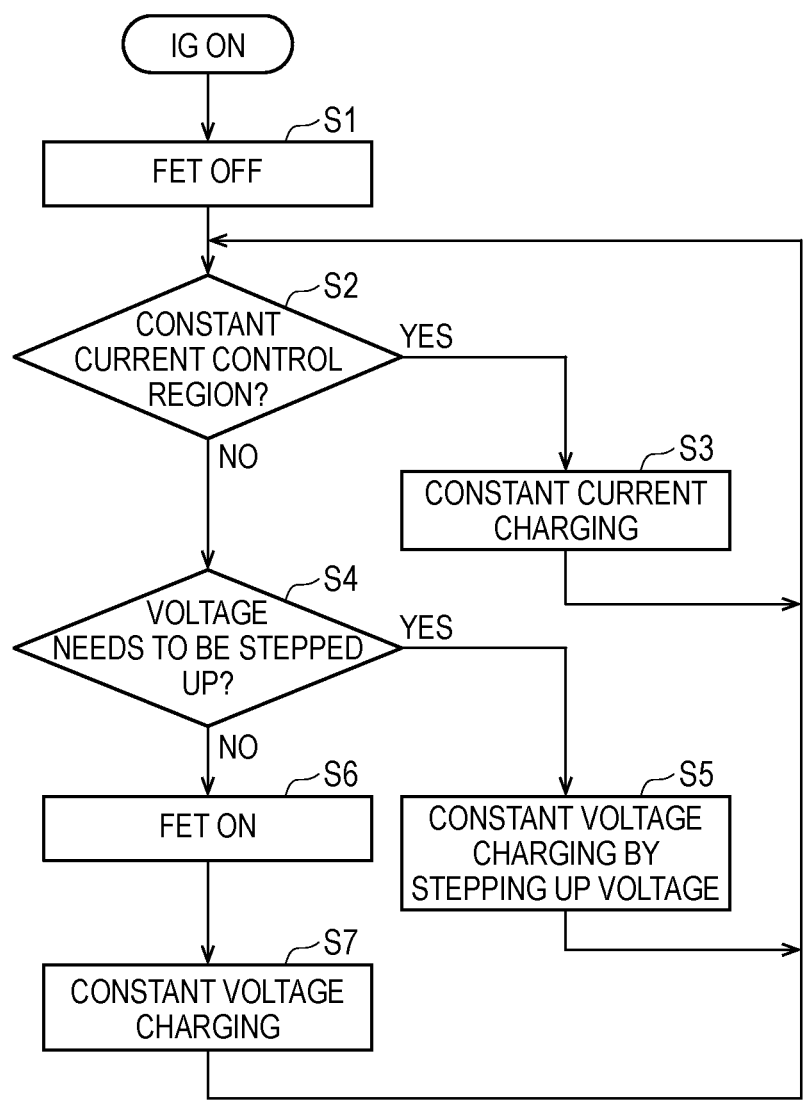
FIG. 5 is a flowchart illustrating one embodiment of a charging method.
Figure 6:
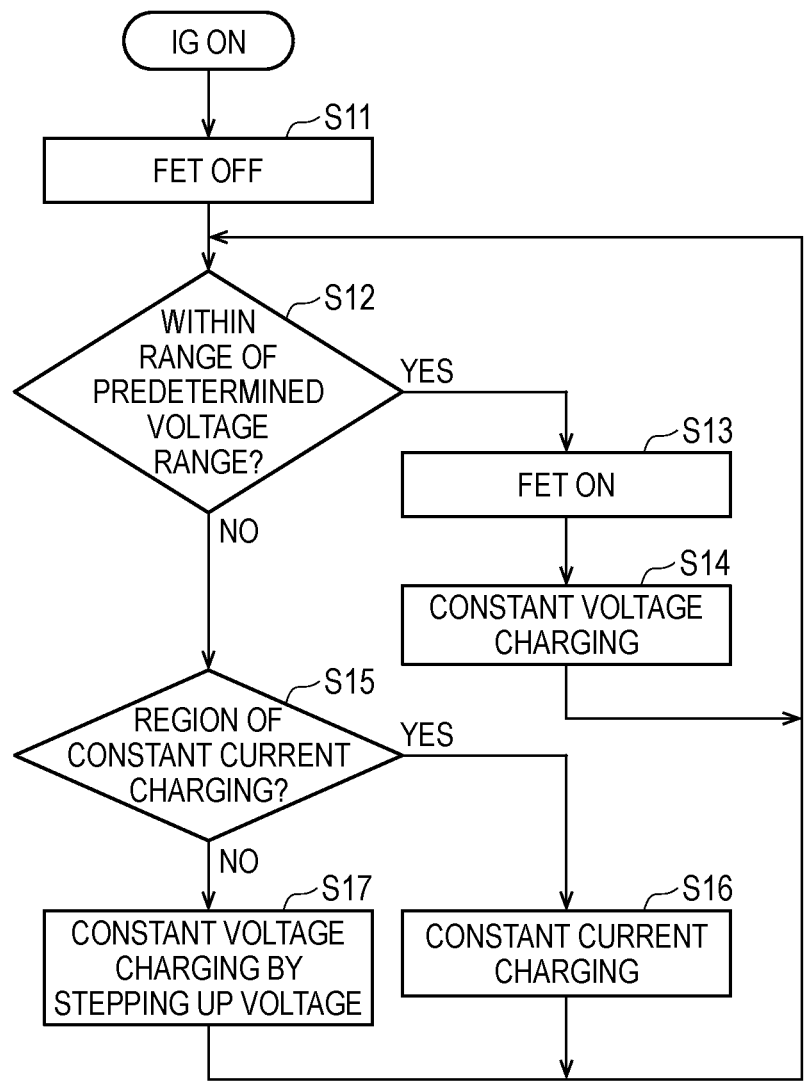
FIG. 6 is a flowchart illustrating another embodiment of the charging method.

Embodiments will be described below with reference to the drawings. FIG. 1 is a block diagram illustrating an embodiment of a power supply system and a DCDC converter device. FIG. 2 is an explanatory diagram of a region controlled to be constant current charging, and FIG. 3 and FIG. 4 are explanatory diagrams of a region controlled to be constant voltage charging. FIG. 5 and FIG. 6 are flowcharts according to a charging method.

<Regarding Power Supply System 1 and DCDC Converter Device 2>

In FIG. 1, a power supply system 1 is mounted in, for example, an electric automobile or a hybrid automobile. The power supply system 1 includes a DCDC converter device 2 in the configuration. When the configuration of the power supply system 1 is described in more detail, the power supply system 1 includes a high voltage battery 3, a high voltage power supply circuit 4, a first DCDC converter 5, a low voltage power supply circuit 6, a low voltage lead battery 7, a first load 8 (load), the DCDC converter device 2, a low voltage lithium battery 9, a second load 10, and a control device 11. Each part of the above configuration will be described below.

<Regarding High Voltage Battery 3>

In FIG. 1, the high voltage battery 3 is configured as an assembled battery in which a plurality of secondary battery cells such as a lithium ion battery or a nickel hydrogen battery are connected in series. Further, the high voltage battery 3 is configured to be able to output a high voltage of several hundred volts by direct current. The high voltage battery 3 is configured to be able to supply electric power to a high voltage load (not shown) operating at high voltage. Further, the high voltage battery 3 is configured to be able to supply electric power to a low voltage system side via the high voltage power supply circuit 4 and the first DCDC converter 5. As known from FIG. 1, only a positive electrode side (high voltage power supply circuit 4) is shown in this embodiment, and a negative electrode side is omitted.

<Regarding First DCDC Converter 5>

In FIG. 1, the first DCDC converter 5 is of a step-down type, and is configured to step down and output a high voltage of several hundred volts by direct current until charging to the low voltage lead battery 7 is possible. In the first DCDC converter 5, the output is controlled by the control device 11 based on a predetermined duty ratio. The output from the first DCDC converter 5 flows to the low voltage power supply circuit 6.

<Regarding Low Voltage Lead Battery 7>

In FIG. 1, the low voltage lead battery 7 is a so-called lead storage battery (secondary battery) and is connected to the low voltage power supply circuit 6. As shown in graphs of FIG. 2 to FIG. 4, the low voltage lead battery 7 has characteristics (capacity characteristics of a lead battery) serving as a downward-sloping solid line. The low voltage lead battery 7 is charged with step-down electric power from the first DCDC converter 5. In the low voltage lead battery 7, the voltage is watched by the control device 11.

<Regarding First Load 8>

In FIG. 1, the first load 8 is equipment that operates with low voltage electric power to be supplied from the low voltage lead battery 7, such as a combination meter. Further, the first load 8 include an electronic control unit including the control device 11. The control device 11 will be described later.

<Regarding DCDC Converter Device 2>

In FIG. 1, the DCDC converter device 2 is a characteristic portion of the power supply system 1, and miniaturization thereof contributes to miniaturization of the entire system. The DCDC converter device 2 includes a second DCDC converter 12 and a bypass circuit 13. The DCDC converter device 2 is disposed between the low voltage lead battery 7 and the low voltage lithium battery 9.

<Regarding Second DCDC Converter 12>

In FIG. 1, the second DCDC converter 12 is connected to the low voltage power supply circuit 6 between the low voltage lead battery 7 and the low voltage lithium battery 9.

The second DCDC converter 12 is configured to change a voltage of the electric power input from the low voltage lead battery 7 and to charge the low voltage lithium battery 9 by constant current charging. The second DCDC converter 12 is configured to slightly step up a voltage of the electric power input from the low voltage lead battery 7 and to charge the low voltage lithium battery 9 by constant voltage charging. As the first DCDC converter 5, in the second DCDC converter 12, output is controlled by the control device 11 based on a predetermined duty ratio. The second DCDC converter 12 is understood by the following description, but electric power does not always flow after an ignition switch is turned on. Therefore, the number of internal FETs can be reduced compared with a case where electric power always flows. Accordingly, capacity of the second DCDC converter 12 can be reduced. Due to the second DCDC converter 2 including the bypass circuit 13, electric power does not always flow to the second DCDC converter 12.

<Regarding Bypass Circuit 13>

In FIG. 1, the bypass circuit 13 is connected to the low voltage power supply circuit 6 and is configured to bypass the second DCDC converter 12. Further, the bypass circuit 13 is configured such that the electric power from the low voltage battery 7 can flow to the low voltage lithium battery 9 without passing through the second DCDC converter 12. The bypass circuit 13 is also used as a circuit in which a dark current flows (an example, but a preferred form). A switch unit 14 is disposed on such a way of the bypass circuit 13. In the present embodiment, an FET is employed as the switch unit 14. The on/off of the switch unit 14 is controlled by the control device 11. When the switch unit 14 is turned on under control of the control device 11, the electric power from the low voltage lead battery 7 is bypassed, and as a result, the low voltage lithium battery 9 is charged with a charging voltage of the low voltage lead battery 7.

<Regarding Low Voltage Lithium Battery 9>

In FIG. 1, the low voltage lithium battery 9 is a publicly known lithium ion battery and is configured for low voltage. The low voltage lithium battery 9 is provided to operate the second load 10 connected to the downstream. As shown in the graphs of FIG. 2 to FIG. 4, the low voltage lithium battery 9 has a characteristic as a thick solid line having two bends and downward-sloping dots. The low voltage lithium battery 9 is charged with the electric power from the second DCDC converter 12 or the electric power that bypasses the second DCDC converter 12. Similarly to the low voltage lead battery 7, the low voltage lithium battery 9 is watched by the control device 11. Specifically, the voltage of the low voltage lithium battery 9 is watched by the control device 11.

<Regarding Second Load 10>

In FIG. 1, the second load 10 is equipment that operates with low voltage electric power to be supplied from the low voltage lithium battery 9. An electronic control unit including the control device 11 may be used as the second load 10.

<Regarding Control Device 11 and Switch Control Unit 15>

In FIG. 1, the control device 11 has a function for, for example, battery management. The control device 11 is provided with a microcomputer (CPU), a storage device, and the like. The control device 11 is provided with the switch control unit 15 that controls on/off of the switch unit 14. The switch control unit 15 is configured to be able to control on/off of the switch unit 14 based on a state of charge (SOC) of the low voltage lithium battery 9. The switch control unit 15 is configured to be able to control on/off of the switch unit 14 based on a charging voltage of the low voltage lithium battery 7 due to the first DCDC converter 5. The configuration may be based on the voltage of the low voltage lithium battery 9 and a predetermined voltage range W (see FIG. 2) not limited to such on/off control.

<Regarding Action of Power Supply System 1 and DCDC Converter Device 2>

The graphs of FIG. 2 to FIG. 4 show remaining capacity characteristics of the low voltage lithium battery 9. A vertical axis of the graph indicates a voltage[V] of the low voltage lithium battery 9, and is displayed from 9.0 to 15.0 in 0.5 increments. A horizontal axis of the graph indicates remaining capacity [%], and is displayed from 0% to 100% in 20 increments. Here, the remaining capacity is used in the same meaning as the state of charge. A gentle downward-sloping solid line in the graph indicates the capacity characteristics of the low voltage lead battery 7. Among two wavy lines in a horizontal direction, the lower wavy line indicates 12.86 V serving as a lower limit of use. The upper wavy line indicates 14.8V of an upper limit of charging. A solid line in the horizontal direction indicates 13.3 V. A thick solid line having two bends and downward-sloping dots indicates the remaining capacity characteristics of the low voltage lithium battery 9.

In FIG. 2, when the remaining capacity (state of charge) of the low voltage lithium battery 9 is, for example, 20% or less, a region is controlled to be constant current charging. In the region, the switch unit 14 is in an off state, and constant current charging is performed via the second DCDC converter 12. A thick arrow in the drawing indicates flow of electric power. The switch unit 14 may be in an off state depending on whether the voltage is within a range of the predetermined voltage range W indicated by arrows in a vertical direction in the drawing. Due to watching of the control device 11 (due to watching of the electronic control unit), the region of FIG. 2 is not entered in general. Therefore, it can be speculated that frequency of use in the region of FIG. 2 is small and there is no need for rapid charging. Therefore, the number of FETs provided inside the second DCDC converter 12 can be reduced. Accordingly, the capacity of the second DCDC converter 12 can also be reduced.

In FIG. 3, when the remaining capacity (state of charge) of the low voltage lithium battery 9 is within a range of more than 20% and 70% or less, a region is controlled to be constant voltage charging. In the region, the switch unit 14 is in an on state, and constant voltage charging is performed without passing through the second DCDC converter 12. The number of FETs provided inside the second DCDC converter 12 can be reduced by bypassing in a relatively wide remaining capacity (state of charge) range. Accordingly, the capacity of the second DCDC converter 12 can also be reduced. The switch unit 14 may be in an on state depending on whether the voltage is in a range of the predetermined voltage range W.

In FIG. 4, when the remaining capacity (state of charge) of the low voltage lithium battery 9 is, for example, more than 70%, a region is controlled to be constant voltage charging. However, in the region, the switch unit 14 is in an off state, and constant voltage charging is performed by using the second DCDC converter 12. In the region of FIG. 4, the voltage is slightly stepped up to the electric power input from the low voltage lead battery 7, and then the low voltage lithium battery 9 is charged with a constant voltage. The switch unit 14 may be in an off state depending on whether the voltage is in a range of the predetermined voltage range W. In the region of FIG. 4, the second DCDC converter 12 is used, but since 12 V added by a few volts has already been charged, the voltage does not need to be stepped up rapidly. Therefore, the number of FETs provided inside the second DCDC converter 12 may be reduced. Accordingly, the capacity of the second DCDC converter 12 can be reduced.

Here, a charging method will now be described with reference to flowcharts of FIG. 5 and FIG. 6. Reference will also be made to FIG. 2 to FIG. 4 as necessary.

In FIG. 5, when an ignition switch (IG) of a vehicle is turned on, step S1 is executed in the control device 11. The switch unit 14 (FET) of the bypass circuit 13 is turned off by step S1. This is because a dark current flows in the bypass circuit 13 until the ignition switch is turned on. Next, step S2 is executed, and it is determined whether the region is controlled to be constant current charging. If the region is controlled to be constant current charging (Y in step S2), a process shifts to step S3 to perform constant current charging. On the other hand, if the region is controlled to be constant current charging (N in step S2), the process shifts to step S4 to determine whether the voltage needs to be slightly stepped up. When the voltage needs to be slightly stepped up (Y in step S4), the process shifts to step S5, and constant voltage charging is performed after slightly stepping up the voltage. On the other hand, when the voltage does not need to be slightly stepped up (N in step S4), step S6 and step S7 are executed in order. In step S6, the switch unit 14 (FET) of the bypass circuit 13 is turned on. In step S7, charging (constant voltage charging) is performed at a charging voltage of the low voltage lead battery 7.

In FIG. 6, when an ignition switch (IG) of a vehicle is turned on, step S11 is executed in the control device 11. The switch unit 14 (FET) of the bypass circuit 13 is turned off by step S11. Next, step S12 is executed, and it is determined whether the voltage of the low voltage lithium battery 9 is within the range of the predetermined voltage range W. When the voltage is within the predetermined voltage range W (Y in step S12), step S13 and step S14 are executed in order. In step S13, the switch unit 14 (FET) of the bypass circuit 13 is turned on. In step S14, charging (constant voltage charging) is performed at a charging voltage of the low voltage lead battery 7. On the other hand, when the voltage is not within the range of the predetermined voltage range W (N in step S12), the process shifts to step S15, and it is determined whether the region is controlled to be constant current charging. If the region is controlled to be constant current charging (Y in step S15), a process shifts to step S16 to perform constant current charging. On the other hand, if the region is controlled to be constant current charging (N in step S15), the process shifts to step S17, the voltage is slightly stepped up, and then constant voltage charging is performed.

<Effects of Power Supply System 1, DCDC Converter Device 2, and Charging Method>

As described above with reference to FIG. 1 to FIG. 6, according to the power supply system 1 and the DCDC converter device 2 as an embodiment, since a bypass circuit 13 for bypassing the second DCDC converter 12 is provided, the second DCDC converter 12 can be used only when it is necessary to charge the low voltage lithium battery 9. Specifically, when at least constant current charging is performed, the second DCDC converter 12 may be used; when the constant voltage charging is performed without any particular conditions (except when the voltage is slightly stepped up), the second DCDC converter 12 may be bypassed and charged. As a result, the number of FETs in the second DCDC converter 12 can be reduced, and the capacity of the second DCDC converter 12 can be reduced. Therefore, it is possible to miniaturize the power supply system 1 and the DCDC converter device 2. As a charging method, the same effects as above can be obtained.

It goes without saying that the invention can be variously modified without departing from the spirit of the invention.

[Description of Reference Numerals and Signs]

1 Power supply system, 2 DCDC converter device. 3 High voltage battery. 4 High voltage power supply circuit, 5 First DCDC converter, 6 Low voltage power supply circuit, 7 Low voltage lead battery, 8 First load (load), 9 Low voltage lithium battery, 10 Second load, 11 Control device, 12 Second DCDC converter, 13 Bypass circuit, 14 Switch unit. 15 Switch control unit, W Predetermined voltage range

What is claimed is:
1. A power supply system comprising:
a high voltage battery;
a first DCDC converter connected to the high voltage battery;
a low voltage lead battery configured to be charged from the high voltage battery via the first DCDC converter;
a low voltage lithium battery connected to a low voltage power supply circuit, the low voltage lead battery, and a load;
a second DCDC converter connected to the low voltage power supply circuit and disposed between the low voltage lead battery and the low voltage lithium battery;
a bypass circuit connected to the low voltage power supply circuit to bypass the second DCDC converter; and
a control device configured to watch the low voltage lithium battery and control on/off of a switch unit provided in the bypass circuit, wherein
the first DCDC converter is connected to the second DCDC converter in series;
the second DCDC converter is configured to step up or down a voltage of an electric power input from the low voltage lead battery and to charge the low voltage lithium battery;
the control device is configured to put the switch unit, of the bypass circuit, in an off state and to perform constant current charging through the second DCDC converter when a capacity of the low voltage lithium battery is equal to or smaller than a predetermined value; and
the control device is configured to put the switch unit, of the bypass circuit, in an on state and to perform constant voltage charging without passing through the second DCDC converter when a capacity of the low voltage lithium battery is greater than a predetermined value.

2. The power supply system according to claim 1, wherein a dark current flows in the bypass circuit.

3. The power supply system according to claim 1, wherein the control device includes a switch control unit configured to control on/off of the switch unit based on a state of charge of the low voltage lithium battery.

4. The power supply system according to claim 3, wherein the switch control unit is configured to control on/off of the switch unit based on a charging voltage of the low voltage lead battery by the first DCDC converter.

5. The power supply system according to claim 1, wherein the control device includes a switch control unit configured to control on/off of the switch unit based on a voltage and a predetermined voltage range of the low voltage lithium battery.

6. A DCDC converter device comprising:
a second DCDC converter disposed between a low voltage lead battery charged from a high voltage battery via a first DCDC converter and a low voltage lithium battery connected to a low voltage power supply circuit, the low voltage lead battery, and a load; and
a bypass circuit connected to the low voltage power supply circuit and bypassing the second DCDC converter, wherein
the bypass circuit is provided with a switch unit which is controlled to turn on/off by a control device which is an external configuration,
the first DCDC converter is connected to the second DCDC converter in series;
the second DCDC converter is configured to step up or down a voltage of an electric power input from the low voltage lead battery and to charge the low voltage lithium battery;
the control device is configured to put the switch unit, of the bypass circuit, in an off state and to perform constant current charging through the second DCDC converter when a capacity of the low voltage lithium battery is equal to or smaller than a predetermined value; and
the control device is configured to put the switch unit, of the bypass circuit, in an on state and to perform constant voltage charging without passing through the second DCDC converter when the capacity of the low voltage lithium battery is greater than the predetermined value.

7. The DCDC converter device according to claim 6, wherein a dark current flows in the bypass circuit.

8. A charging method comprising:
using the DCDC converter device according to claim 6; and
turning on the switch unit of the DCDC converter device and performing constant voltage charging on a low voltage lithium battery.

* * * * *